US010007772B2

(12) United States Patent
Slaby et al.

(10) Patent No.: US 10,007,772 B2
(45) Date of Patent: *Jun. 26, 2018

(54) METHOD AND APPARATUS FOR AUTHENTICATING ACCESS TO A MULTI-LEVEL SECURE ENVIRONMENT OF AN ELECTRONIC DEVICE

(71) Applicant: Google Technology Holdings LLC, Mountain View, CA (US)

(72) Inventors: Jiri Slaby, Buffalo Grove, IL (US); Rachid M. Alameh, Crystal Lake, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/374,577

(22) Filed: Dec. 9, 2016

(65) Prior Publication Data

US 2017/0124316 A1    May 4, 2017

Related U.S. Application Data

(63) Continuation of application No. 14/081,167, filed on Nov. 15, 2013, now Pat. No. 9,542,783.

(51) Int. Cl.
*G07C 9/00* (2006.01)
*G06F 21/32* (2013.01)
(Continued)

(52) U.S. Cl.
CPC .............. *G06F 21/32* (2013.01); *G06F 21/45* (2013.01); *G06K 9/00087* (2013.01)

(58) Field of Classification Search
CPC ..... G06F 21/32; G06F 21/45; G07C 9/00079; G06K 9/00087

(Continued)

(56) References Cited

U.S. PATENT DOCUMENTS 6,393,139 B1 * 5/2002 Lin .................. G06F 21/316
382/124
6,944,773 B1    9/2005 Abrahams
(Continued)

FOREIGN PATENT DOCUMENTS

EP    1050993 A2    11/2000
EP    1418486 A2    12/2004

OTHER PUBLICATIONS

Holz et al., "Fiberio: A Touchscreen that Senses Fingerprints," Proceedings of the 26th annual ACM symposium on User Interface Software and Technology, Oct. 8-11, 2013, 10 pp.
(Continued)

*Primary Examiner* — Edwin Holloway, III

(57) ABSTRACT

An electronic system utilizes a method (500) for authenticating access to a multi-level secure environment. According embodiments, the system stores (501) fingerprint data for at least one authorized human user of the system. The fingerprint data for each authorized user includes copies of fingerprints for two or more fingers of the user. Some time after storing the fingerprint data, the system senses (503) one or more fingers of an individual who is attempting to use the system and compares (505) the sensed finger data to the stored fingerprint data. When at least some of the sensed finger data matches copies of fingerprints in the stored fingerprint data, the system determines (509) a quantity of matching fingerprints. The system then determines (525) a security level for the individual based on the quantity of matching fingerprints and provides access (527) to particular functionality of the system based on the determined security level.

21 Claims, 6 Drawing Sheets

(51) Int. Cl.
*G06F 21/45* (2013.01)
*G06K 9/00* (2006.01)

(58) Field of Classification Search
USPC .......................................... 340/5.52; 382/124
See application file for complete search history.

(56) References Cited

U.S. PATENT DOCUMENTS

| | | | | |
|---|---|---|---|---|
| 9,542,783 | B2* | 1/2017 | Slaby | G07C 9/00079 |
| 9,542,786 | B2* | 1/2017 | Enomoto | G07D 9/008 |
| 2002/0138742 | A1 | 9/2002 | Hamid et al. | |
| 2003/0054800 | A1* | 3/2003 | Miyashita | H04M 1/67 455/411 |
| 2004/0151353 | A1* | 8/2004 | Topping | F41A 17/066 382/124 |
| 2004/0210771 | A1 | 10/2004 | Wood et al. | |
| 2005/0134427 | A1* | 6/2005 | Hekimian | G06F 21/32 340/5.53 |
| 2005/0223235 | A1* | 10/2005 | Nicholas | G06F 21/32 713/186 |
| 2007/0140530 | A1* | 6/2007 | Coogan | G06F 3/03547 382/115 |
| 2010/0231356 | A1* | 9/2010 | Kim | G06F 3/048 340/5.83 |
| 2012/0105081 | A1 | 5/2012 | Shaikh et al. | |
| 2013/0278383 | A1* | 10/2013 | Boshra | G06F 21/32 340/5.83 |
| 2015/0137938 | A1 | 5/2015 | Slaby et al. | |

OTHER PUBLICATIONS

International Search Report and Written Opinion from International Application No. PCT/US2014/064969, dated Jan. 26, 2015, 9 pp.

Kim, et al., "Multi-Touch Authentication on Tabletops", Proceedings of ACM CHI 2010 Conference on Human Factors in Computing Systems: Input, Security, and Privacy Policies, Apr. 10-15, 2010, pp. 1093-1102, Atlanta, Ga,USA.

Feng, et al., "Continuous Mobile Authentication using Touchscreen Gestures", 2012 IEEE Conf. on Technologies for Homeland Security (HST), Nov. 13-15, 2012, pp. 451-456.

Napa Sae-Bae, et al., "Biometric-Rich Gestures: A Novel Approach to Authentication on Multi-Touch Devices", Proceedings of SIG CHI2012 Conference on Human Factors in Computing Systems, May 5-10, 2012, pp. 977-986, Austin, TX, USA.

Morpho, "Identification Morphotop Live Scan Device", http://www.morpho.com/IMG/pdf/morpho_identification_ive_morphotop-3.pdf, Oct. 2012, 2 pages.

Lenovo, "How to Configure Fingerprint Reader Software— ThinkPad R52, T42/p, T43/p, X41, X41 Tablet", Document ID: HT036545, 2013, 21 pages.

Mondokey, "Mondokey Biometric Access Control Security System", MondoKey Brochure Version B, 2012, 32 pages.

Alameh, et al., "Adaptive Sensing Component Resolution Based on Touch Location Authentication", U.S. Appl. No. 13/928,470, filed Jun. 27, 2013 39 pages.

International Preliminary Report on Patentability from International Application No. PCT/US2014/064969, dated May 26, 2016, 6 pp.

Prosecution History from U.S. Appl. No. 14/081,167, dated Jan. 15, 2016 through Sep. 1, 2016, 76 pp.

\* cited by examiner

METHOD AND APPARATUS FOR AUTHENTICATING ACCESS TO A MULTI-LEVEL SECURE ENVIRONMENT OF AN ELECTRONIC DEVICE

RELATED APPLICATION

This application is a continuation of U.S. application Ser. No. 14/081,167, filed Nov. 15, 2013, the entire contents of each of which are hereby incorporated by reference.

TECHNICAL FIELD

The present disclosure relates generally to using fingerprint detection technology to authenticate user access to an electronic system and, more particularly, to using fingerprint detection technology to authenticate access to a multi-level secure environment within an electronic system.

BACKGROUND

Fingerprint authentication systems are well known and typically used in single level secure environments to either permit or deny access to physical spaces (e.g., buildings, interior rooms, parking garages, cabinets, and/or safes), equipment (e.g., computers and/or servers), or software/data (e.g., email, encrypted files, secure software applications, secure folders, and/or secure websites). Such authentication systems may be wired or wireless and typically include a touchpad, a sensing mechanism, control software, and memory. One such system as embodied in a wireless fob is marketed by Privaris Inc. of Charlottesville, Va. at the website www.privaris.com/authentication_fingerprint.html. Most conventional systems sense the fingerprint of one finger or one finger at a time (for multiple fingers); while other less popular systems sense multiple fingers simultaneously.

When desiring access to a protected space, piece of equipment, or software application, the user places the palm-side, distal phalanx of a finger, such as the thumb, onto the touchpad, and the sensing mechanism scans the valleys and ridges in the surface of the user's finger to detect the fingerprint, and the control software compares the detected fingerprint to fingerprints previously stored in memory. If a match occurs, permission to access is granted; otherwise, permission is denied and the authentication process must be repeated.

There is an opportunity to apply fingerprint detection technology to multi-level secure environments, whereby access to different levels of the environment has correspondingly different authentication requirements. Additionally, there is an opportunity to provide user feedback during the fingerprint detection process.

BRIEF DESCRIPTON OF THE DRAWINGS

Figure 1:
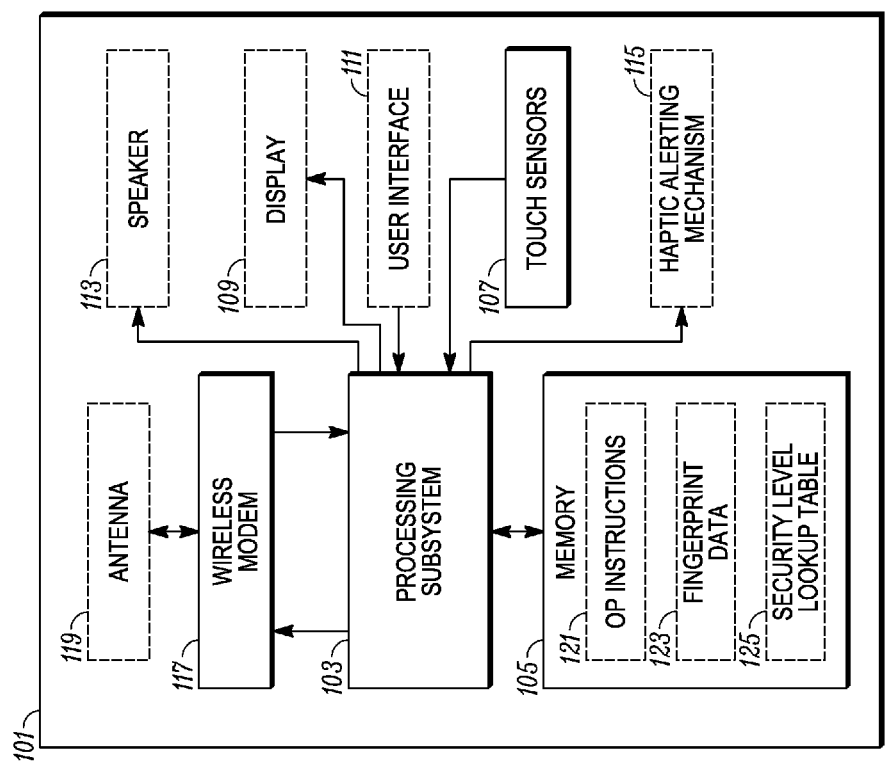
FIG. 1 is an electrical block diagram of an electronic system configured to authenticate access to a multi-level secure environment of the system, in accordance with a first exemplary embodiment.

Skilled artisans will appreciate that elements in the figures are illustrated for simplicity and clarity and have not necessarily been drawn to scale. For example, the dimensions of some of the elements in the figures may be exaggerated alone or relative to other elements or the elements may be shown in block diagram form to help improve the understanding of the various exemplary embodiments.

DETAILED DESCRIPTION

The present disclosure generally describes a method and apparatus for authenticating access to a multi-level secure environment of an electronic system. The electronic system may be a distributed client-server type system or a self-contained system, such as a portable electronic device. According to one embodiment, fingerprint data for at least one authorized human user of the electronic system is stored in memory of the electronic system to produce stored fingerprint data. The fingerprint data for each authorized human user includes copies of fingerprints for two or more fingers of the authorized human user. Some time after the fingerprint data is stored, the electronic system senses or detects (e.g., scans) one or more fingers of an individual who is touching one or more external surfaces of the electronic system and attempting to use the system, to produce sensed finger data. The sensing may occur on a finger-by-finger basis or, more preferably, two or more fingers may be sensed contemporaneously (e.g., at about the same time or substantially simultaneously).

When at least some of the sensed finger data matches copies of fingerprints in the stored fingerprint data (e.g., to a degree as is customary in the fingerprint matching field), the electronic system determines a quantity of matching fingerprints and a security level for the individual based on the quantity of matching fingerprints. The electronic system then provides access to functionality of the electronic system based on the determined security level. For example, the electronic system may provide access to one or more software applications and/or data files based on the security level determined for the individual. In such a case, each application or data file may have a respective security level associated with it. Additionally or alternatively, the electronic system may display information (e.g., icons or program names) identifying software applications that are accessible to the individual based on the determined security level.

In an alternative embodiment, the electronic system may provide feedback to the individual indicating the quantity of matching fingerprints. Such feedback may be visual, audible, and/or haptic. For example, the electronic system may display the quantity of matching fingerprints and/or provide vibratory pulses indicating the quantity of matching fingerprints. In a further embodiment, the electronic system may determine the fingers of the individual for which the sensed finger data matches fingerprints in the stored fingerprint data. In other words, the electronic system may determine the finger types corresponding to which fingers were sensed by virtue of having detected fingerprints that match stored fingerprints. In such a case, the security level for the individual may be determined based on the quantity of matching fingerprints and the finger types (e.g., right or left index finger, right or left thumb, and so forth) which correspond to the matching fingerprints. Additionally, the electronic system may provide feedback to the individual indicating the finger types for which the sensed finger data matches copies of fingerprints in the stored fingerprint data. That is, the electronic system may provide feedback indicating the finger types for which matching fingerprints were detected. The feedback may be visual, audible, and/or haptic (e.g., one vibratory pulse for a matching left thumb print, two pulses for a matching left index fingerprint, and so forth). Alternatively, the electronic system may provide feedback indicating the finger types for which matching fingerprints were not detected (e.g., one vibratory pulse for a missing left thumb print, two pulses for a missing left index fingerprint, and so forth).

In a further embodiment, the electronic system may sense one or more additional fingers of the individual subsequent to provision of the feedback to produce additional sensed finger data. For example, if the original sensed finger data matches only two finger types of the individual, the electronic system may indicate such quantity to the individual (and optionally which two finger types they are), and allot a period of time during which the individual can seek to have some, more, or all fingers sensed or re-sensed (e.g., re-scanned) in an attempt to have additional fingerprints authenticated. When the feedback indicates only the quantity of matching fingerprints previously detected, the individual may have all fingers re-sensed; whereas, when the feedback indicates which sensed finger types had matching fingerprints, the individual may have all fingers re-sensed or only the remaining fingers re-sensed (i.e., finger types for which there were no prior matches of sensed finger data to copies of fingerprints in the stored fingerprint data). In either event, the sensing or re-sensing may include one or more additional fingers of the individual, which either were not previously sensed or were sensed but did not correspond to any fingerprints in the stored fingerprint data. The finger sensing or re-sensing may occur on a finger-by-finger basis or two or more fingers may be sensed contemporaneously. The electronic system compares the additional sensed finger data to the stored fingerprint data and determines a quantity of additional matching fingerprints (and optionally the finger types to which they correspond) when at least some of the additional sensed finger data matches copies of fingerprints in the stored fingerprint data. Where all fingers are re-sensed (or as many fingers as the individual elects to have re-sensed), the quantity of additional matching fingerprints is the quantity of matching fingerprints resulting from re-sensing less the quantity of matching fingerprints resulting from the original finger sensing or prior finger sensing. The security level for the individual may then be determined based on the aggregate quantity of matching fingerprints (e.g., the quantity that originally matched plus the quantity that additionally matched). In one embodiment, the security level may increase in relation to an increasing quantity of matching fingerprints.

In yet another embodiment, instead of determining a single security level for the individual based on the aggregate quantity of matching fingerprints, the electronic system may determine one security level (e.g., a base level) based on the quantity of matching fingerprints determined from an original finger sensing and a new or second security level based on the aggregate quantity of matching fingerprints determined from the original plus additional finger sensing. The electronic system may then provide access to different functionality within the system based on the different security levels. In this case, the re-sensing of the individual's fingers may occur during a time window allotted for sensing fingerprints. For example, the electronic system may allot a time period (e.g., 60 seconds) for detecting fingerprints from the time the system detects a touching of an external surface of the system (e.g., the housing, touchscreen, or keyboard of a portable electronic device). During the allotted time period, the system may provide feedback to the individual indicating the quantity of matching fingerprints detected and permit the individual to have additional fingers sensed to increase the quantity of matching fingerprints. However, the system may also allow the individual to access functionality of the system during the fingerprint sensing time period. Therefore, the system may determine the first security level for the individual based on the original quantity of matching fingerprints and permit access to certain system functionality based on the first security level.

For instance, where the electronic system is a portable electronic device, the device may sense three fingers of the individual's left hand on external surfaces of the device's housing (e.g., such as when the individual picks up the device, as may be sensed by accelerometer, gyroscope, or proximity sensor readings) and determine they match three stored fingerprints. Accordingly, the device may determine a security level based on detecting three fingerprints and provide access to certain functionality (e.g., a particular group of applications) based on the determined security level. Additionally, after providing feedback to the individual indicating that three fingerprints were detected, the device may sense additional fingers of the individual during the allotted fingerprint sensing time period (e.g., by re-scanning the housing sensors and/or sensing one or more touches of the device's touchscreen) and compare the additional sensed finger data to the stored fingerprint data. When at least some of the additional sensed finger data matches copies of fingerprints in the stored fingerprint data, the electronic device may determine a quantity of additional matching fingerprints and a new, second security level for the individual based on the aggregate quantity of matching fingerprints. Accordingly, the device may provide access to additional functionality (e.g., access to an additional group of applications) based on the new security level.

According to yet another embodiment, the electronic system may determine a context for an electronic device forming at least part of the system and which the individual is attempting to use. In such a case, the system may determine a security level for the individual based on the context of the electronic device and the quantity of matching fingerprints. Alternatively, the security level may be determined based on the context of the electronic device, the quantity of matching fingerprints, and/or which finger types correspond to the matching fingerprints. The context may relate to internal and/or environmental conditions in which the electronic device is operating. For example, the context of the electronic device may include location, time-of-day, speed (if it's in motion), general environment (e.g., inside or outside), elevation, altitude, user habits, day-of-week, day-of-year, currently active software application(s), frequented routes, calendar events, and/or any other information relating to the physical surroundings and/or usage of the device.

According to a further embodiment, fingerprint data for at least one authorized human user of the electronic system is stored in memory of the electronic system to produce stored fingerprint data. The fingerprint data for each authorized human user includes copies of fingerprints for two or more fingers of the authorized human user. Some time after the fingerprint data is stored, the electronic system senses or detects (e.g., scans) one or more fingers of an individual who is attempting to use the electronic system to produce sensed finger data. The sensing may occur on a finger-by-finger basis or, more preferably, two or more fingers may be sensed contemporaneously. When at least some of the sensed finger data matches copies of fingerprints in the stored fingerprint data, the electronic system determines fingers of the individual (finger types) for which the sensed finger data matches fingerprints in the stored fingerprint data. Based on which finger types of the individual correspond to the matching fingerprints, the electronic system determines a security level for the individual. The electronic system then provides access to functionality of the electronic system based on the determined security level. For example, the electronic system may provide access to one or more software applications and/or data files based on the security level determined for the individual. Additionally or alternatively, the electronic system may display information (e.g., icons or program names) identifying data and/or software applications that are accessible to the individual based on the determined security level.

According to a further implementation, an electronic system includes memory, two or more sensors, and a processing subsystem operably coupled to the sensors and having access to the memory. The memory is operable to store fingerprint data for at least one authorized human user of the electronic system. The fingerprint data for each authorized human user includes copies of fingerprints for two or more fingers of the authorized human user. The sensors are arranged to sense touching of one or more human-accessible surfaces of the system (e.g., a housing, a display screen, a touchscreen, a touchpad, buttons, keys, and so forth). The processing subsystem is operable in accordance with stored operating instructions to: control the sensors to sense one or more fingers of an individual who is touching the human-accessible surfaces and attempting to use the system; process outputs from the sensors to produce sensed finger data; compare the sensed finger data to the stored fingerprint data; determine a quantity of matching fingerprints when at least some of the sensed finger data matches copies of fingerprints in the stored fingerprint data; determine a security level for the individual based on the quantity of matching fingerprints; and provide access to functionality of the electronic system based on the security level determined for the individual.

According to yet another embodiment, an electronic system includes memory, two or more sensors, and a processing subsystem operably coupled to the sensors and having access to the memory. The memory is operable to store fingerprint data for at least one authorized human user of the electronic system. The fingerprint data for each authorized human user includes copies of fingerprints for two or more fingers of the authorized user. The sensors are arranged to sense touching of one or more human-accessible surfaces of the system. The processing subsystem is operable in accordance with stored operating instructions to: control the sensors to sense one or more fingers of an individual who is touching the human-accessible surfaces and attempting to use the system; process outputs from the sensors to produce sensed finger data; compare the sensed finger data to the stored fingerprint data; determine fingers of the individual (finger types) for which the sensed finger data matches fingerprints in the stored fingerprint data to produce finger type identification data; determine a security level for the individual based on the finger type identification data; and provide access to functionality of the electronic system based on the determined security level.

According to a further version, a portable electronic device includes one or more human accessible surfaces, memory, a display, two or more sensors, and a processing subsystem. The memory is operable to store fingerprint data for at least one authorized human user of the electronic system. The fingerprint data for each authorized human user includes copies of fingerprints for two or more fingers of the authorized user. The sensors are arranged to sense touching of the human-accessible surfaces. The processing subsystem is operable in accordance with stored operating instructions to: control the sensors to sense one or more fingers of an individual who is touching the human-accessible surfaces and attempting to use the system; process outputs from the sensors to produce sensed finger data; compare the sensed finger data to the stored fingerprint data; determine a quantity of matching fingerprints when at least some of the sensed finger data matches copies of fingerprints in the stored fingerprint data; determine a security level for the individual based on the quantity of matching fingerprints; and display information on the display based on the determined security level. The displayed information may identify at least one of software applications and data files that are accessible to the individual based on the determined security level.

According to yet another embodiment, a portable electronic device includes one or more human accessible surfaces, memory, a display, two or more sensors, and a processing subsystem. The memory is operable to store fingerprint data for at least one authorized human user of the electronic system. The fingerprint data for each authorized human user includes copies of fingerprints for two or more fingers of the authorized user. The sensors are arranged to sense touching of the human-accessible surfaces. The processing subsystem is operable in accordance with stored operating instructions to: control the sensors to sense one or more fingers of an individual who is touching the human-accessible surfaces and attempting to use the system; process outputs from the sensors to produce sensed finger data; compare the sensed finger data to the stored fingerprint data; determine fingers of the individual for which the sensed finger data matches fingerprints in the stored fingerprint data to produce finger type identification data; determine a security level for the individual based on the finger type identification data; and display information on the display based on the determined security level. The displayed information may identify at least one of software applications and data files that are accessible to the individual based on the determined security level.

By authenticating access to system functionality based on quantities of matching fingerprints and/or identifications of finger types corresponding to matching fingerprints, the disclosed system not only limits who can access it but also limits available functionality to that which is best tailored to an authorized user's present circumstances. For example, detection of five or fewer fingers with matching fingerprints linked to the same hand within a predetermined time period (e.g., 60 seconds) may suggest, either alone or in conjunction with a determined context for a device being accessed, that an authorized user is holding a device with one hand and, therefore, may be driving or otherwise predisposed. Accordingly, the device may permit the individual to access a telephone application in a hands-free mode and read emails and texts audibly, but may prohibit the individual from responding to emails or texts or conduct Internet searching via a touchscreen input. On the other hand, detection of more than five fingers (and/or particular finger types on one or both hands) with matching fingerprints may suggest that the authorized user has both hands free and is in position to use the system to perform a wider variety of functions.

Figure 2:
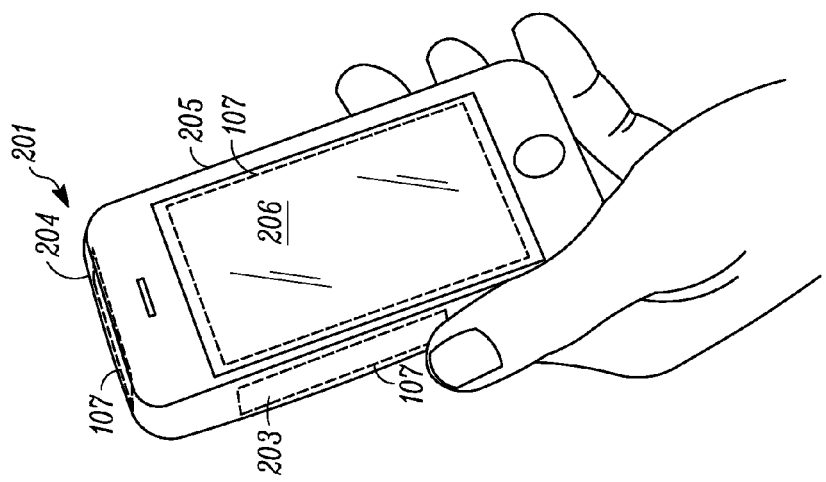
FIG. 2 illustrates an electronic system embodied as a smartphone to illustrate exemplary locations of sensors on human-accessible surfaces of the system, in accordance with an alternative exemplary embodiment.

Aspects of the present disclosure can be more readily understood with reference to FIGS. 1-5, in which like reference numerals designate like items. FIG. 1 illustrates an electrical block diagram of an electronic system 101 configured to authenticate access to a multi-level secure environment of the system 101, in accordance with a first exemplary embodiment. In the embodiment illustrated in FIG. 1, the system 101 is contained within a single electronic device, such as a smartphone, a cellular phone, a tablet computer, a portable multimedia device, a personal digital assistant, a gaming controller, a portable electronic reading device, a laptop computer, or any other electronic device. A smartphone embodiment of the electronic system 101 is illustrated in FIG. 2.

According to the exemplary embodiment of FIG. 1, the electronic system 101 includes, inter alia, a processing subsystem 103, memory 105, and a plurality of sensors 107 arranged to sense touching of one or more human-accessible surfaces of the system 101. The system 101 may optionally include various other elements, including a display 109, a user interface 111, a speaker 113, a haptic alerting mechanism 115 (e.g., a vibratory alert). The display 109, the speaker 113, and the haptic alerting mechanism 115 may individually and/or collectively form a user feedback mechanism, as discussed in more detail below. Also, an optional wireless modem 117 and antenna arrangement 119) may be included to link the system 101 to other, networked elements.

The processing subsystem 103 may include one or more microprocessors, one or more microcontrollers, one or more digital signal processors (DSPs), a graphics processing unit (GPU), one or more state machines, logic circuitry, or any other device or combination of devices that processes information based on operating or programming instructions 121 stored in memory 105 accessible by the processing subsystem 103. One of ordinary skill in the art will appreciate that the processing subsystem 103 can be implemented using multiple processors as may be required to handle the processing requirements of the electronic system 101. One of ordinary skill in the art will further recognize that when the processing subsystem 103 has one or more of its functions performed by a state machine or logic circuitry, the memory containing the corresponding operating instructions 121 can be embedded within the state machine or logic circuitry as opposed to being external to the processing subsystem 103, as shown by the electronic system memory 105 illustrated in FIG. 1.

The memory 105 may store a variety of information, including operating instructions 121 (e.g., software or computer programs) for execution by the processing subsystem 103, fingerprint data 123, and a security level lookup table 125. The fingerprint data 123 includes electronically searchable copies of fingerprints for fingers of authorized human users of the electronic system 101. For each authorized user, the fingerprint data 123 includes copies of fingerprints (full images or mathematical representations, such as interoperable minutiae templates) for two or more fingers of the user. The fingerprint data 123 may be indexed by finger type, which may or may not include an indication of hand type (i.e., right or left hand). Fingerprint data 123 may be captured for more than one user. The fingerprint data 123 may be loaded into the memory 105 during provisioning of the electronic system 101 for use on a wireless network (when the electronic system 101 includes applicable wireless communication functionality), and/or at a later time during which security protocols are stored in the system 101, such as after an owner of the electronic system 101 has determined who is permitted to use the electronic system.

The security level lookup table 125 associates security levels with quantities and/or finger type identifications of matching fingerprints as determined by the processing subsystem 103 during operation of the electronic system 101. Each authorized user of the electronic system 101 may have different security levels for different quantities and/or finger type identifications of matching fingerprints. For example, matching two fingerprints of a first authorized user may allow access into a particular banking application, yet accessing the same banking application in the same system 101 may require five fingerprints of a second authorized user.

The security level lookup table 125 may also associate security levels with contexts of an electronic device forming all or part of the electronic system 101. The contexts may relate to internal and/or environmental conditions in which the electronic device is operating and may include geographic locations (e.g., as determined through use of a navigation subsystem and/or application), velocities, directions of travel, times of day, general environment (e.g., inside or outside), elevation, altitude, user habits, frequented routes, calendar events, currently active software application (s), and/or any other information relating to the physical surroundings and/or usage of the electronic device.

Each security level in the lookup table 125 corresponds to a particular amount of system functionality to which the user may be granted access. System functionality may include, but is not limited to, applications, functions within applications (e.g., read, edit, add, delete, etc.), access to data files, interfaces to smart home appliances, interfaces to social networks, cloud communication capability, remote download capability, device-to-device communication capability, and/or interfaces to automotive subsystems (e.g., audio and/or navigation subsystems), just to name a few. The security level lookup table 125 may be loaded into the memory 105 during manufacturing of the electronic system 101 or at a later point in time during which security protocols are stored in the system 101.

The memory 105 may be separate from the processing subsystem 103 as depicted in FIG. 1 or may be integrated into the processing subsystem 103 as discussed above. The memory 105 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate system memory 105 and that the system memory 105 may include one or more individual memory elements.

Each touch sensor 107 may be implemented using capacitive contact sensors (e.g., indium tin oxide (ITO) sensors), optical sensors, copper sensors, silicon-based sensors, ultrasonic sensors, or other sensors arranged to detect when a human-accessible, external surface of the system 101 has been touched. For example, as illustrated in FIG. 2, which depicts the electronic system 101 implemented as a smartphone 201, the touch sensors 107 may be integrated into or just below the external surfaces 203, 204, 205 of the smartphone's housing, as well as in or just below the surface of the display screen 206. Those of ordinary skill in the art will readily recognize and appreciate that the locations of the touch sensors 107 in the aforementioned exemplary smartphone embodiment are merely illustrative and that the positioning and quantity of touch sensors 107 may vary to meet the touch and fingerprint detecting sensitivity needs of a particular electronic system 101.

When included, the display 109 may be any conventional or future-developed display, such as a liquid crystal display (LCD), a plasma display, a light emitting diode (LED) display, an organic LED (OLED) display, or any other display technology. The display 109 includes a display screen and appropriate conventional drivers, and may optionally include a GPU for illuminating various picture elements (e.g., pixels) of the display screen as instructed by the processing subsystem 103. Alternatively, the GPU may be separate from the display 109 (e.g., in an integrated circuit (IC) that is separate from the IC containing the display drivers), or be integrated into the processing subsystem 103 as discussed above. In some versions, the display 109 includes touch sensors 107 so as to form a touchscreen display, where such sensors 107 may be controlled by the processing subsystem 103 to sense a user's fingers in sufficient detail to capture fingerprints.

When included, the user interface 111 may be incorporated into the display 109 as described previously and/or include other user interface components. For example, the user interface 111 may include rocker keys, buttons, a keypad, a keyboard, a scroll wheel, a thumbwheel, one or more microphones and associated speech conversion/processing software, a touchpad, and/or any other now-known or future-developed user interface technology. Thus, touch sensors 107 incorporated into the display 109 may form part of the user interface 111, as may the speaker 113.

When included, the speaker 113 may be a conventional speaker or audio transducer sized, shaped, and positioned to accommodate operation of the particular electronic system 101. The speaker 113 may also form part of the user interface 111 as noted previously. The haptic alerting mechanism 115, when included, may be a conventional vibration system (electrically driven motor connected to an unbalanced weight) that is also sized, shaped, and positioned to accommodate operation of the particular electronic system 101. Alternatively, the haptic alerting mechanism 115 may include a piezoelectric vibration system, an acoustic system, or any other tactile alerting system.

The wireless modem 117 and antenna system 119 may be included where the electronic system 101 is capable of wireless communications. The wireless modem 117 is generally used herein to refer to the modems and transceivers used to provide all wireless communication functionality for the electronic system 101. Thus, as used herein, the wireless modem 117 may include one or more wireless wide area modems (e.g., such as are used to access cellular or satellite communications systems) and/or one or more short-range wireless modems (e.g., such as are used to access short-range communication networks, including Wi-Fi, Bluetooth, Zigbee, and other short-range networks). The antenna system 119 may be active or passive and accommodates the wireless communication functionalities of the wireless modem 117, as is known in the art.

Figure 3:
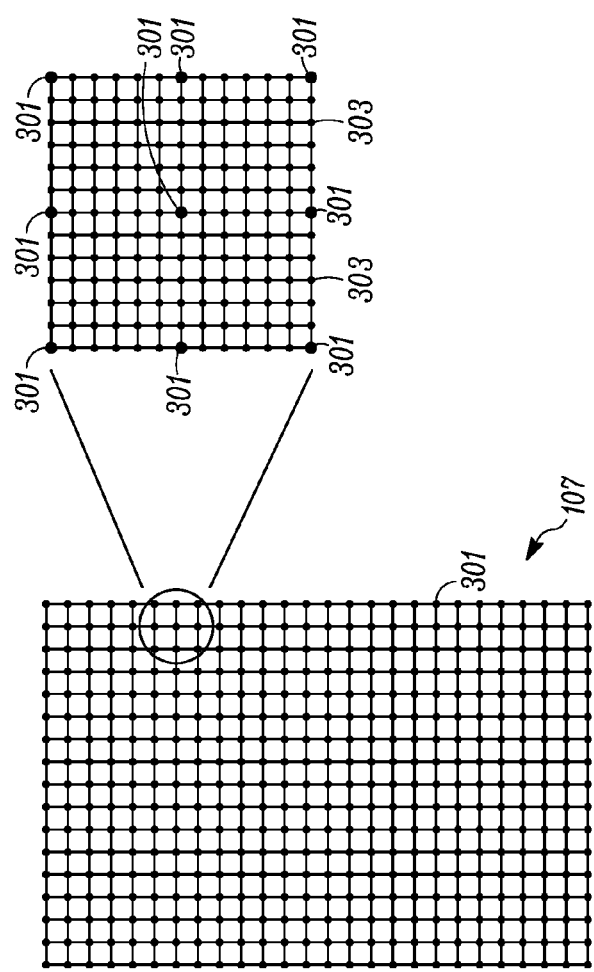
FIG. 3 illustrates an exemplary arrangement of sensors which, under control of a processing subsystem, facilitates varying resolutions of finger detection, in accordance with another exemplary embodiment.

FIG. 3 illustrates one exemplary arrangement of sensors 107 which, under control of the processing subsystem 103, facilitates varying resolutions of finger detection. The exemplary arrangement includes two groups of capacitive sensors 301, 303. Sensors 301 in the first group are spaced such that they perform low resolution sensing when activated alone. Such sensing would enable the processing subsystem 103 to determine, upon receiving outputs from the sensors 301, that a touch or swipe had occurred, but would not enable the processing subsystem 103 to determine fingerprints of fingers performing the touching. When high resolution sensing is desired, the second group of sensors 303 may be activated together with the first group of sensors 301. Thus, sensors 303 in the second group are spaced much closer together than are the sensors 301 in the first group. According to one embodiment, the sensors 301 in the first group may be spaced about five (5) millimeters apart and sensors in the second group may be spaced about 50-70 micrometers apart or from a sensor 301 in the first group. The spacing of the sensors 303 in the second group are preferably such that ridges and valleys in the surfaces of fingers may be detected so as to capture the fingerprints of fingers that are in contact with sensors 107 on an external surface of the system 101.

According to one embodiment, the processing subsystem 103 may control the sensors 107 so as to activate the high and low resolution sensors 301, 303 during a time period allotted for sensing fingerprints of an individual attempting to use the system 101, and activate only the low resolution sensors 301 during all other time periods so as to efficiently use direct current (DC) power resources of the system 101. Such an approach would be particularly beneficial where the system 101 is or includes a portable electronic device and the sensors 107 are integrated into the portable device's external surfaces. The time period for sensing fingerprints may commence after the processing subsystem 103 determines that, based upon outputs of the low resolution sensors 301, at least one external surface of the system 101 has been touched. During the fingerprint sensing period, the system 101 may provide feedback to the user through a user feedback mechanism, such as one or more of the display 109, the speaker 113, and the haptic alerting mechanism 115, to indicate how many fingerprints have been detected and/or identify the finger types for which fingerprints have been detected. Alternatively, the high and low resolution sensors 301, 303 may remain permanently activated while the electronic system 101 is powered on, where DC power saving (e.g., battery power saving) is not a concern.

Figure 4:
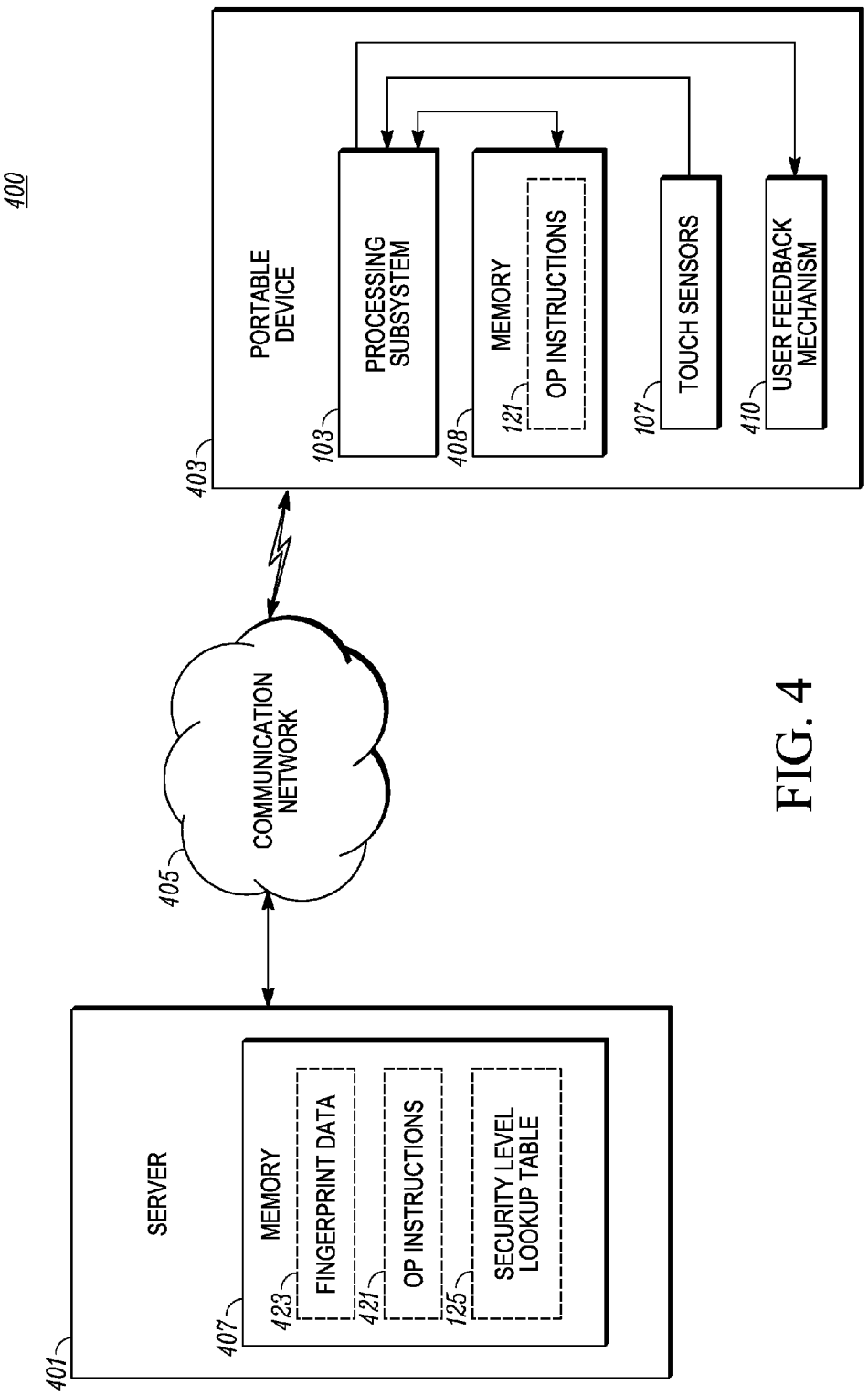
FIG. 4 is an electrical block diagram of a distributed electronic system configured to authenticate access to a multi-level secure environment of the system, in accordance with another exemplary embodiment.

FIG. 4 is an electrical block diagram of a distributed electronic system 400 configured to authenticate access to a multi-level secure environment, in accordance with another exemplary embodiment. In the embodiment illustrated in FIG. 4, the system 400 includes one or more servers 401 (one shown for illustration) installed at one or more fixed locations and at least one portable electronic device 403 (one also shown for illustration). The server 401 and the portable device 403 communicate through a communication network 405, which may include wireless and wireline links. In the exemplary distributed system 400, the server 401 may include, inter alia, memory 407 that stores fingerprint data 423. The distributed version of the system 400 may be used where the database of fingerprint data 423 has a larger memory requirement than can be accommodated by the memory 408 of the portable device 403. The server memory 407 may further optionally store operating instructions 421 to be executed by the portable device 403 and/or the server 401 to carry out various functions described herein. Where the server memory 407 stores the portable device's operating instructions 121, the portable device 403 may retrieve the operating instructions 121 from the server 401 over the communication network 405 as part of a general software download or update, or on an as-needed basis at runtime.

In the distributed system embodiment, the portable device 403 may include, inter alia, a processing subsystem 103, touch sensors 107 and human-accessible surfaces to which they are associated, memory 408 for storing the operating instructions 121 (which may have been pre-installed or retrieved from the server 401), and a user feedback mechanism 410. The user feedback mechanism 410 may be implemented by any one or more of a visual output device (e.g., a display 109), an audio output device (e.g., a speaker 113), and a haptic alerting mechanism 115 (e.g., an unbalanced motor).

Figure 5A:
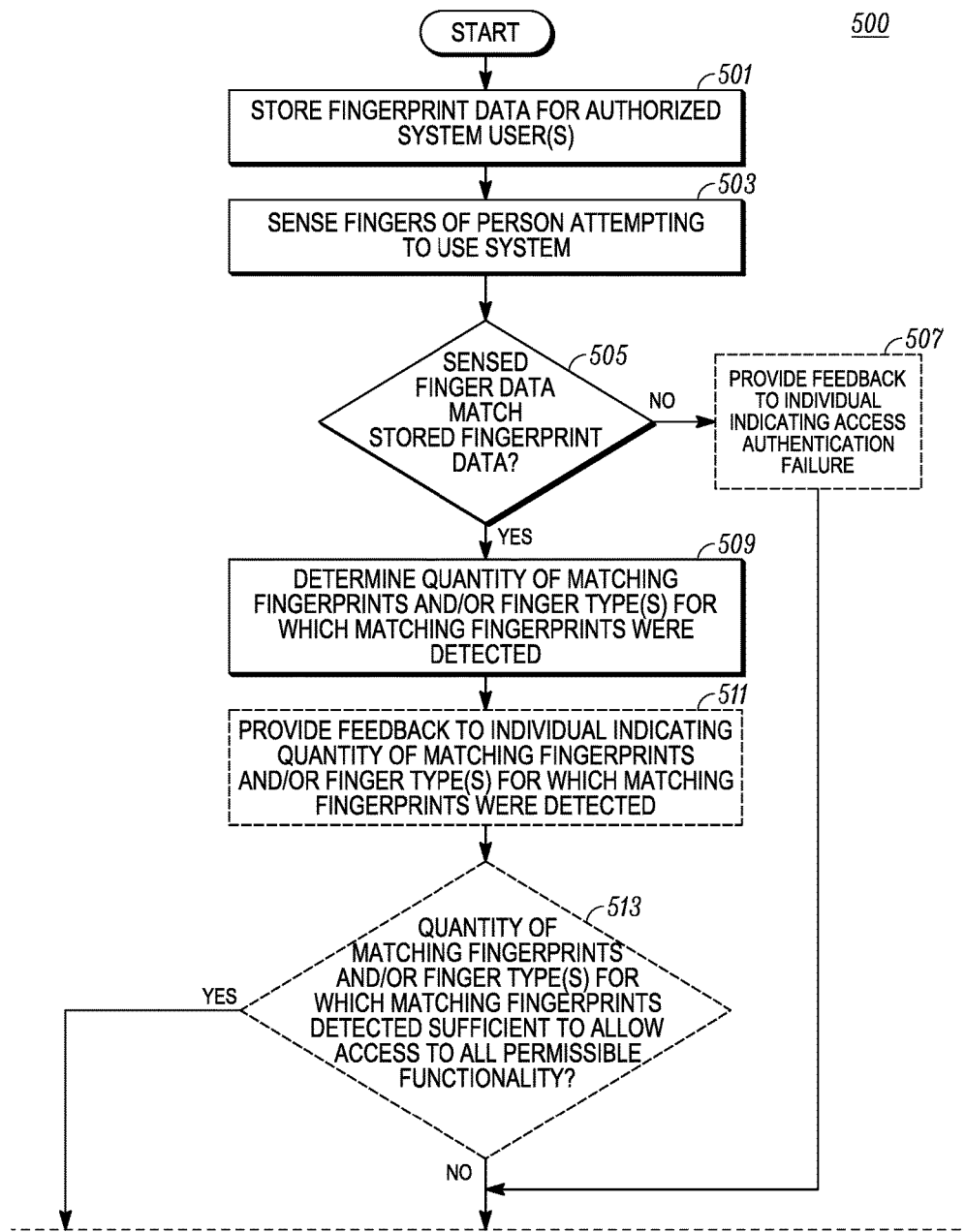
FIG. 5 (FIGS. 5A and 5B) is a logic flow diagram of steps executed by an electronic system to authenticate access to a multi-level secure environment of the system, in accordance with various exemplary embodiments.
Figure 5B:
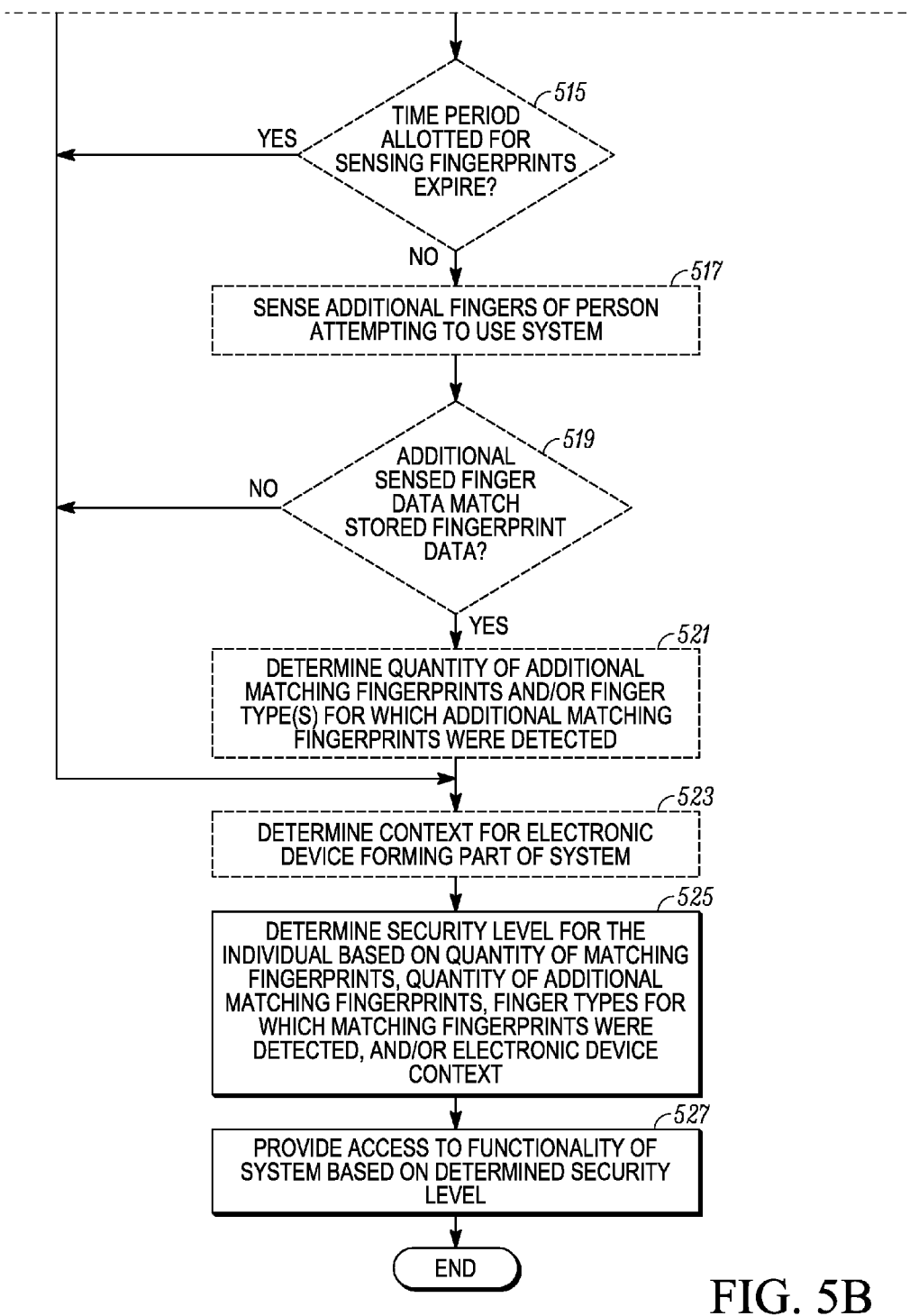

Operation of the electronic system 101, 400 in accordance with exemplary implementations may be further understood with reference to FIGS. 1-5. Referring to FIG. 5, a logic flow diagram 500 is depicted illustrating steps executed by the electronic system 101, 400 to authenticate access to a multi-level secure environment. The logic flow steps may be executed by various components of the electronic system 101, 400, including, but not limited to, the processing subsystem 103, (and its constituent hardware and/or software modules), the memory 105, 407, 408, the touch sensors 107, 301, 303, and the user feedback mechanism 410. The steps executed by the processing subsystem 103 are preferably performed in accordance with the operating instructions 121, 421 stored in the memory 105, 407, 408. For purposes of the following illustrative description of system operation, reference will be primarily made to the portable electronic device embodiment of the system 101 as illustrated in FIGS. 1 and 2, except as may be necessary to describe alternatives that are specific to the distributed system embodiment as illustrated in FIG. 4.

According to the logic flow of FIG. 5, the electronic system 101 stores (501) fingerprint data 123, 423 for one or more authorized system users in system memory 105. The fingerprint data 123, 423 may have been obtained using conventional fingerprint scanning devices that are external to the system 101 and loaded into the memory 105 for use in accordance with the present disclosure.

Some time after the fingerprint data 123 has been stored in memory 105, the system 101 senses (503) fingers of a person who is touching one or more of the system's external surfaces (e.g., surfaces 203, 204, 205) in an attempt to use the system 101. Such sensing may be performed by the touch sensors 107 of the system 101, under control of the processing subsystem 103. The sensing may be performed to sense multiple fingers contemporaneously and/or to sequentially sense one finger at a time. For example, a user may contemporaneously press a left thumb, a left middle finger, and a left ring finger onto the touch sensors 107 of the system's external surfaces 203-205 (such as when the user holds a smartphone 201 or other portable device 403 in his/her left hand) and later press a right index finger and a right middle finger onto the touch sensors 107 of the touchscreen display 109 (such as when the user attempts to access the functionality of the smartphone 201 or other portable device 403).

The touch sensors 107 may be configured and controlled so as to continually achieve a sensing resolution that is sufficient to enable the sensors 107 to produce outputs from which the processing subsystem 103 may generate sensed finger data that effectively represents full or partial fingerprints of the sensed fingers. Alternatively, the touch sensors 107 may be configured and controlled so as to selectively achieve, on an as-needed basis, a sensing resolution sufficient to enable the processing subsystem 103 to generate sensed finger data that effectively represents or re-creates fingerprints of the sensed fingers. The alternative approach may be used in systems 101, such as portable electronic devices 403, which rely upon limited battery power, so as to incur the additional power consumption required of the higher, fingerprint sensing resolution only when fingerprint sensing is expected to occur. The system 101 may sense the individual's fingers serially (e.g., one at a time), jointly (e.g., contemporaneously), or some combination of both (e.g., multiple fingers at one time and then individual fingers at later times, or vice versa) as the fingers contact the external surfaces of the system 101.

In accordance with one exemplary power efficient embodiment, such as shown with reference to FIG. 3, the touch sensors 107 may include spaced apart low resolution sensors 301 and more closely spaced apart high resolution sensors 303. In such a case, the processing subsystem 103 may initially control the low resolution sensors 301 to be active and the high resolution sensors 303 to be inactive, in order to control and mitigate power consumption. The low resolution sensors 301 may provide output voltages corresponding to the capacitances applied at the sensors 301. Thus, when a finger comes into close proximity of one or more low resolution sensors 301, the output voltages of the affected sensors 301 change relative to their untouched states, enabling the processing subsystem 103 to detect a touch is occurring. In this embodiment, the low resolution sensors 301 may be configured to achieve a sensing resolution that is capable of detecting a touch, but is not necessarily fine enough to detect fingerprints. Upon determining the occurrence of a touch, the processing subsystem 103 may activate the high resolution sensors 303 to thereby enable the high resolution sensors 303 alone, or together with the low resolution sensors 301, to more finely sense the fingers of the individual who is attempting to use the system 101. The sensing resolution provided by the high resolution sensors 303 (or the high and low resolution sensors 301, 303 together) is such that the peaks and valleys along the surface of the individual's finger can be detected to enable the processing subsystem 103 to effectively re-create or otherwise determine one or more fingerprints by processing the sensors' outputs.

Having sensed fingers of an individual attempting to use the system 101, the system 101 compares (505) the sensed finger data to the stored fingerprint data 123 to determine whether the sensed finger data matches copies of fingerprints in the stored fingerprint data 123. For purposes of the present disclosure, sensed finger data matches a copy of a fingerprint in the stored fingerprint data if the two sets of data match in accordance with customary fingerprint matching criteria (e.g., have at least a predefined quantity of matching friction ridge characteristics or so-called "points"). Alternatively, fingerprint matching criteria may vary according to the system functionality to be accessed. For example, access to highly sensitive applications or data may require closer fingerprint matches (e.g., matches with greater quantities of matching points); whereas, access to less sensitive applications or data may require less robust fingerprint matches (e.g., matches with lower quantities of matching points).

According to one embodiment, the processing subsystem 103 compares the sensed finger data produced from the outputs of the sensors 107 to the stored fingerprint data 123. If none of the sensed finger data matches any of the stored fingerprint data 123, the system 101 may optionally provide (507) feedback to the individual who is attempting to use the system 101 indicating an access authentication failure. The feedback may be provided through the display 109 or any other user feedback mechanism 410. For example, the processing subsystem 103 may cause the display 109 to show a message such as "No fingerprints authenticated." As another example, the processing subsystem 103 may display an access denied or authentication failed message on the display 109.

On the other hand, if the sensed finger data matches copies of one or more fingerprints in the stored fingerprint data 123, the system 101 determines (509) a quantity of matching fingerprints and/or the finger type(s) for which matching fingerprints were detected. For example, according to one embodiment, the processing subsystem 103 determines the quantity of fingerprints in the stored fingerprint data 123 that matches the fingerprints re-created from or represented by the sensed finger data. Alternatively, where the stored fingerprint data 123 includes information identifying the individual and the finger type associated with each fingerprint in the stored fingerprint data 123 (e.g., left or right thumb, index finger, middle finger, ring finger, and pinky), the processing subsystem 103 may determine the finger type or types for which one or more matching fingerprints were detected. In yet a further embodiment, the processing subsystem 103 may determine both the quantity of matching fingerprints and the finger types for which matching fingerprints were detected, where the stored fingerprint data 123 includes information identifying the individual and the finger type associated with each fingerprint in the stored fingerprint data 123.

After determining the quantity of matching fingerprints and/or the finger types for which matching fingerprints were detected, the system 101 may optionally provide (511) feedback to the individual indicating the quantity of matching or missing fingerprints and/or the finger types for which matching fingerprints were detected or are still missing. For example, the processing subsystem 103 may provide feedback by displaying the applicable information (e.g., quantity of matching or missing fingerprints and/or finger type identifications) on the display 109 of the system 101 or through use of another user feedback mechanism 410 or combination of feedback mechanisms. For example, the processing subsystem 103 may cause the display 109 to show a message such as "Left index finger and left middle finger recognized", a hand graphic with green left index and left middle fingertips, "Three fingerprints matched", or "Right index and middle fingers not recognized, scan again for higher security level." As another example, the processing subsystem 103 may activate the haptic alerting mechanism 115 an appropriate quantity of times so as to provide vibratory pulses corresponding to the quantity of matching or missing fingerprints or the finger types for which matching fingerprints were detected or are missing (e.g., three successive vibration pulses may indicate that three matching fingerprints were detected or that the fingerprint of the left middle finger was detected). Those of ordinary skill in the art will readily recognize and appreciate that other individual or combinational feedback approaches may be used to provide feedback to the individual.

In addition to providing feedback to the individual relating to the quantity and/or finger type identifications of matching fingerprints, the system 101 may determine (513) whether the quantity of fingerprints and/or the finger types for which matching fingerprints were detected are sufficient to allow the individual to access all of the system functionality that is permissibly available to the individual. The functionality that is permissibly available to the individual may include all of the system functionality (e.g., where the system 101 is used solely by the individual) or some lesser amount of functionality (e.g., where the system 101 is shared by multiple individuals).

If the result of the "all access" inquiry is negative, the system 101 may optionally determine (515) whether a time period allotted for sensing fingerprints has expired. According to one embodiment, the processing subsystem 103 may start a fingerprint sensing timer upon sensing that a human-accessible, external surface of the system 101 has been touched. In such a case, the processing subsystem 103 may determine the quantity of matching fingerprints and/or the finger types for which matching fingerprints are detected only during the time period allotted for sensing fingerprints. For example, the processing subsystem 103 may start a one minute timer upon sensing when an external surface of the system 101 was touched after transitioning from a standby mode to an active mode of the system 101. Of course, those of ordinary skill in the art will readily recognize and appreciate that other start triggers and durations of time may be used for the fingerprint sensing time period. Alternatively, the processing system 103 may periodically or even continually process outputs of the sensors 107 to produce sensed finger data instead of employing a pre-defined fingerprint sensing time period. For example, the processing subsystem 103 may periodically or continually activate high resolution sensors 303 integrated into or positioned proximate (e.g., just below) the human-accessible surfaces of the system 101, such as surfaces 203, 204, 205, so as to enable the processing subsystem 103 to receive sensor outputs from which fingerprints of sensed fingers can be determined. In some cases, the sensor outputs may not enable the processing subsystem 103 to determine any fingerprint data because valid fingerprints may not be present (e.g., such as where a side of a finger or a palm is in contact with a touch sensor-monitored system surface 203, 204, 205).

If the time period allotted for sensing fingerprints has not expired, the system 101 may optionally sense (517) additional fingers of the individual who is attempting to use the system 101. For example, as noted above, the processing subsystem 103 may maintain activation of the high resolution sensors 303 (and possibly the low resolution sensors 301 also, depending on the particular sensor configuration) throughout a fingerprint sensing time period, or for any other length of time as provided in the operating instructions 121 executed by the processing subsystem 103. Thus, the individual may have some or all of his/her fingers sensed or re-sensed during the applicable fingerprint sensing time period.

When additional fingers are sensed, the processing subsystem 103 may receive and process additional outputs from the sensors 107, 301, 303 corresponding to the newly sensed or re-sensed fingers to produce additional sensed finger data. Where fingerprints have been sensed by the sensors 107, 301, 303, the additional sensed finger data represents the sensed fingerprints. For example, where the feedback provided to the individual indicates that the quantity and/or finger type identities of matching fingerprints correspond to less than all of the individual's fingers, the individual may place all of his/her fingers, or only those fingers for which there were no prior matches of sensed finger data to copies of fingerprints in the stored fingerprint data 123, on the external surfaces of the system 101 to allow the sensors 301, 303 to sense them. In other words, subsequent to the system's provision of feedback to the individual, the individual may seek to have additional fingers sensed by the system 101 for authentication purposes. The finger or fingers of the individual may be sensed or re-sensed serially (on a finger-by-finger basis), jointly (e.g., contemporaneously), or some combination of both (e.g., fingers on the left hand may be sensed contemporaneously, followed by fingers on the right hand) in the manner generally described above with respect to block 503.

After sensing additional fingers of the individual (e.g., during the allotted fingerprint sensing time period, if any), the system 101 may optionally compare (519) the additional sensed finger data to the stored fingerprint data 123 to determine whether the additional sensed finger data matches copies of fingerprints in the stored fingerprint data 123. As discussed above with respect to block 505, the processing subsystem 103 may compare the additional sensed finger data produced based upon the outputs of the touch sensors 107 (e.g., fingerprint re-creations or representations) to the stored fingerprint data 123.

If at least some of the additional sensed finger data matches copies of one or more fingerprints in the stored fingerprint data 123, the system 101 determines (521) a quantity of additional matching fingerprints and/or the finger types for which additional matching fingerprints were detected. For example, according to one embodiment, the processing subsystem 103 determines the quantity of fingerprints in the stored fingerprint data 123 that matches the fingerprints re-created from or represented by the additional sensed finger data. Alternatively, where the stored fingerprint data 123 includes information identifying the individual and the finger type associated which each stored fingerprint, the processing subsystem 103 may determine the finger types for which additional matching fingerprints were detected. In yet a further embodiment, the processing subsystem 103 may determine both the quantity of additional matching fingerprints and the finger types for which additional matching fingerprints were detected, where the stored fingerprint data 123 includes information identifying the individual and the finger type associated with each stored fingerprint. The quantity of additional matching fingerprints therefore represents the quantity of fingerprints for which there were no prior matches detected.

After determining the quantity of additional matching fingerprints and/or the finger types for which additional matching fingerprints were detected, the system 101 may provide feedback to the individual indicating the quantity of additional matching fingerprints, the total quantity of matching fingerprints (e.g., the sum of the original and additional matching fingerprints), the total quantity of still missing fingerprints, the finger types for which additional matching fingerprints were detected, all the finger types for which matching fingerprints were detected, and/or the finger types for which matching fingerprints are still missing. The feedback may be provided through the display 109 or any other user feedback mechanism 410, as discussed above with respect to block 511.

According to one embodiment, when the fingerprint sensing period expires, the system 101 may control the sensors 107 to achieve a lower sensing resolution to conserve battery power, especially where the sensors 107 form part of a portable electronic device 403. For example, the processing subsystem 103 may deactivate high resolution sensors 303 upon expiration of the fingerprint sensing period, thereby leaving only low resolution sensors 301 active until commencement of the next fingerprint sensing period. As discussed above, activation of the low resolution sensors 301 would allow the processing subsystem 103 to determine when an external surface has been touched and the general area or areas of the touch, but would not provide sufficient precision to permit fingerprint determination.

In addition to sensing additional fingers during a fingerprint sensing period or otherwise, the system 101 may optionally determine (523) a context for an electronic device 403 forming part of the system 101, 400, where the individual whose fingers are being sensed is attempting to use the electronic device 403. In the case where the entire system 101 is implemented in an electronic device, the system 101 or its processing subsystem 103 may determine a context for itself. Alternatively, where the electronic device 403 forms part of a distributed system 400 as illustrated in an exemplary manner in FIG. 4, the processing subsystem 103 for the system 101 (which may be included in the electronic device 403) may determine a context for the device 403. The context may include the location of the device, either as an absolute location as determined using any one or more of a variety of conventional location-determining technologies or as a general location, such as at the beach, in a building, traveling in a car, and so forth. For example, where the system 101 is a wireless communication device that includes a global positioning satellite (GPS) receiver and associated processing software, the system 101 may determine its current location using conventional processing of received GPS signals. Alternatively, the system 101, or its processing subsystem 103, may estimate the system's location using other conventional techniques, such as triangulation based on receipt of base station signals from three different fixed base station antennas. The electronic system 101 may determine its location repeatedly over time (e.g., continuously, periodically, in response to trigger events (such as, for example, in response to placement of the device 403 in a vehicle docking station), or at such other times as may be desired) to facilitate a more accurate context. Besides location, the context may include other information, such as day of the week, time of day, speed of travel, direction of travel, general environment (e.g., inside or outside), elevation, altitude, user habits, frequented routes, currently active software application(s), calendar events, and/or any other information relating to the internal and/or environmental conditions foran electronic device 403 forming all or part of the electronic system 101, provided that the device 403 includes appropriate conventional hardware and software for determining such additional context information.

After determining a quantity of matching fingerprints, a quantity of additional matching fingerprints (when applicable), identities of finger types for which matching fingerprints were detected, and/or an optional context for an electronic device of the system 101, the system 101 determines (525) a security level for the individual who is attempting to use the system 101. The processing subsystem 103 may determine the security level by reading the security level from a lookup table 125 stored in memory 105, where each entry of the lookup table 125 identifies a security level (or equivalently access level) and associated requirements. Alternatively, the processing subsystem 103 may determine the security/access level by retrieving security levels from downloaded or stored functionality (e.g., from applications or data files that include designated security levels), where each particular system functionality identifies its own security/access level or levels and associated requirements.

The requirements for a particular security level may include total quantity of matching fingerprints determined during a fingerprint sensing period or such other time duration as may be desired, identities of finger types for which matching fingerprints were detected, and/or a context for an electronic device 403 in the system 101. For example, the security level lookup table 125 (or stored functionality, such as an application or data file) may indicate that an "all access" or equivalent security level includes the requirement of five or more matching fingerprints, a "read only" or equivalent security level includes the requirement of three or four matching fingerprints, a "permit eCommerce transaction" or equivalent security level includes the requirement of at least six matching fingerprints, a "place phone call" or equivalent security level includes the requirement of at least one matching fingerprint, a "view text messages" or equivalent security level includes the requirement of at least two matching fingerprints, and a "send email" or equivalent security level includes the requirement of matching right and left thumb fingerprints.

Alternatively, the security level lookup table 125 (or stored functionality, such as an application or data file) may indicate that an "all access" or equivalent security level includes the requirement of matching fingerprints for all five fingers of one hand and at least an index finger of the other hand. Still further, the security level lookup table 125 or the stored functionality may indicate that an "all access" or equivalent security level includes the requirement of at least five matching fingerprints and matching fingerprints for at least an index finger of both hands. As yet another example, the security level lookup table 125 or stored functionality may indicate that an "all access" or equivalent security level includes the requirement of at least five matching fingerprints, as well as a context that indicates the electronic device 101, 403 is not traveling more than three miles per hour (e.g., suggesting that the individual attempting to use the device 101, 403 is standing or walking). The security level lookup table 125 or downloaded/stored functionality may provide other security levels based on the quantity of matching fingerprints, the finger types for which matching fingerprints must be detected, combinations of matching fingerprint quantities and finger types, combinations of matching fingerprint quantities and electronic device contexts, combinations of matching finger types and electronic device contexts, combinations of electronic device contexts and matching fingerprint quantities and finger types, or any other sets of requirements that include the quantities of matching fingerprints and/or the finger types for which matching fingerprints must be detected. The security/access level examples provided above are merely illustrative and are not intended to limit the scope of the disclosed systems and methods. Those of ordinary skill in the art will readily recognize and appreciate that various types of security levels and their associated requirements may be stored in the security level lookup table 125 or included with downloaded or stored functionality as may be desired under the particular circumstances.

After a security level has been determined for the individual, the system 101 provides (527) access to functionality of the system 101 based on the determined security level. The system functionality may include software applications or functionality available therein, operating system functionality, data file viewing and/or modification functionality, and/or any other functionality provided by the system 101. For example, the processing subsystem 103 may provide access to software applications and/or data files based on the security level determined for the individual. In such a case, the processing subsystem 103 may display information on the display 109 identifying those applications and/or data files that are accessible to the individual based on the determined security level. For instance, the processing subsystem 103 may display all applications and/or data files, but gray out, hide, lock, or otherwise de-emphasize those applications and/or data files to which the individual does not have access based on the determined security level. Still further, where the permitted functionality relates to functionality or operations within an application or data file, the processing subsystem 103 may display only the permitted functionality or operations (or de-emphasize those functions or operations that are not permitted based on the security level). Those of ordinary skill in the art will readily recognize and appreciate that various other approaches may be used to indicate permitted functionality based on the determined security level.

The permitted functionality for a given security level may be included in the security level lookup table 125 or in another searchable portion of the system memory 105, such as another lookup table or database. Alternatively, system functionalities that are subject to security level authentication may include security level identifications or designations that are incorporated into the properties or similar parameters for the functionalities. In such a case, the processing subsystem 103 may search the properties of various system functionalities to determine which functionalities are available for a particular determined security level.

According to an alternative embodiment where additional matching fingerprints are detected during a fingerprint sensing period, the processing subsystem 103 may determine a first security level for the individual based upon an initial quantity of matching fingerprints and a second, new security level for the individual based upon the total quantity of matching fingerprints (e.g., the sum of the initial quantity of matching fingerprints as determined in block 509 and the quantity of additional matching fingerprints as determined in block 521 of FIG. 5). In this case, the first security level may permit access to some system functionality until an additional quantity of matching fingerprints is detected. For example, the first security level may correspond to a security level that permits the user to view email messages, use particular applications and/or view particular data files, but may not correspond to a security level that permits the user to respond to email messages, use other applications, and/or view other data files. The new security level determined as a result of summing the initial quantity of matching fingerprints with the additional quantity of matching fingerprints may permit access to greater system functionality than the first security level. For instance, the new security level may permit the user to respond to emails, use previously prohibited applications, view previously prohibited, hidden, or locked data files, and/or access other system functionality. Such a multi-staged approach to system function accessibility enables the user to access limited system functionality while continuing his/her attempt to obtain authentication to access fuller system functionality.

In an analogous manner, the processing subsystem 103 may determine a first security level for the individual based upon an initial determination of finger types for which matching fingerprints were detected and a second, new security level based upon a subsequent determination of additional finger types for which matching fingerprints were detected during the fingerprint sensing period. In such a case, the first security level may permit access to some system functionality until matching fingerprints for one or more additional finger types are detected. The new security level determined as a result of identifying all finger types for which matching fingerprints were detected during the fingerprint sensing period (which may be less than all of the user's finger types) may permit access to greater system functionality than the first security level. For example, detecting a matching fingerprint for a single (left or right) index finger may cause the processing subsystem 103 to determine a first email security level that permits only the reading of emails. On the other hand, detecting matching fingerprints for the user's left and right thumbs may cause the processing subsystem 103 to determine a second email security level that permits both reading and writing of emails.

In a distributed system embodiment as shown in exemplary form in FIG. 4, the portable electronic device 403 may transmit particular information to the server 401 over the communication network 405, such as raw sensor output data or the sensed finger data (e.g., where the electronic device 403 processes the raw sensor output data), as well as optional information detailing a context for the electronic device 403. In such a case, the server 401 may process the raw data into sensed finger data (if necessary), compare (505, 519) the sensed finger data to the stored fingerprint data 123, determine (509, 521) the quantity of matching fingerprints and/or the finger types for which matching fingerprints have been detected, determine (523) a context for the electronic device 403, and determine (525) a security level for the individual, all in accordance with the operating instructions 421 (e.g., software) stored in server memory 407. The server 401 may then communicate the security level to the electronic device 403 over the communication network 405 to enable the electronic device 403 to provide (527) access to system functionality based on the received security level. In this embodiment, the processing subsystem 103 of the electronic device 403 may query a lookup table to determine the permitted functionality based on the received security level. Also in this embodiment, the server 401 includes sufficient processing capability (e.g., one or more processors) to handle the processing functions identified above.

In a further alternative embodiment, the operating instructions 121 executed by the processing subsystem 103 may cause the processing subsystem 103 to terminate an individual's present security level if the system's external surfaces have not been touched for a predetermined period of time (e.g., as determined by monitoring the outputs of the touch sensors 107). In other words, the system 101 may include an authentication time-out for lack of activity as a general access security measure. If such a time-out was to occur, the system 101 may require re-authentication of the individual before access would be provided to system functionality having security level requirements.

The present disclosure describes methods and apparatus for authenticating access to a multi-level secure environment of an electronic system. In accordance with such disclosure, an electronic system (or a processing subsystem used therein) may determine a security level for an individual attempting to use the system by sensing two or more fingers of the individual, comparing data representative of the sensed fingers to stored fingerprint data, and determining a security level for the individual based on a quantity of matching fingerprints, finger types for which matching fingerprints have been detected, or both. Thus, instead of merely permitting system access based on detecting a potential user's fingerprint, disclosure system may provide different levels of access depending on how many matching fingerprints are detected and/or which finger types correspond to the matching fingerprints. Additionally and contrary to conventional fingerprint detection systems, one disclosed system embodiment provides feedback to the potential system user indicating how many matching fingerprints have been detected and/or which finger types correspond to the matching fingerprints that have been detected. Such feedback enables the potential system user to quickly identify which fingerprint information is missing from the system's perspective and promptly have missing fingers (or all fingers) re-evaluated for purposes of accessing various functionality of the system. To facilitate such re-evaluation, one exemplary system embodiment provides for a fingerprint sensing time period to be set in which the potential user can repeatedly place his/her fingers on external surfaces of the system to allow all fingerprints to be sensed and considered in determining the user's security level.

The apparatus components and method steps described herein have been represented, where appropriate, by conventional symbols in the drawings, showing only those specific details that are pertinent to understanding the disclosed exemplary embodiments and so as not to obscure the disclosure with details that will be readily apparent to those of ordinary skill in the art having the benefit of the description herein. Additionally, while FIG. 5 illustrates one exemplary order for performing steps of the disclosed method, those skilled in the art will recognize and appreciate that the order of steps which are not dependent upon other steps may be changed as desired without departing from the spirit and scope of this disclosure.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, system, article, or apparatus that comprises, includes, has, or contains a list of elements does not include only those elements but may include other elements not expressly listed or inherent to such process, method, system, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic system 101, 400 described herein may be comprised of one or more conventional processors and unique stored program instructions that control the processor(s) to implement, in conjunction with certain non-processor circuits, some, most, or all of the functions of the electronic system 101, 400 and its operational methods as described herein. The non-processor circuits may include, but are not limited to, storage devices (such as memories 105, 407, 408), touch sensors 107, the display 109, the user interface 111, the user feedback mechanism 410, modems 117, antenna systems 119, and hardware portions of the processing subsystem 103, as well as filters, clock circuits, and various other non-processor circuits. As such, the functions of the processor and non-processor circuits may be collectively interpreted as steps of a method for authenticating access to a multi-level secure environment of an electronic system. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments have been described. However, one of ordinary skill in the art will appreciate that various modifications and changes can be made without departing from the scope of the appended claims. Accordingly, the specification and figures are to be regarded in an illustrative rather than a restrictive sense, and all such modifications are intended to be included within the scope of the appended claims. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A method comprising:
    storing, by an electronic system that provides a multi-level secure environment, fingerprint data to produce stored fingerprint data for an authorized user of the electronic system;
    receiving, by the electronic system, sensed fingerprint data that is associated with a plurality of fingerprints of a user;
    comparing, by the electronic system, the sensed fingerprint data to the stored fingerprint data;
    responsive to determining that one or more fingerprints of the sensed fingerprint data matches one or more corresponding fingerprints of the stored fingerprint data for the authorized user, determining, by the electronic system and based on a context associated with the electronic system, a security level from a plurality of security levels that each corresponds to a particular amount of functionality of the electronic system to which the user may be provided access within the multi-level secure environment, wherein the context associated with the electronic system comprises at least one internal or environmental condition in which the electronic system operates;
    providing, by the electronic system, audible or haptic feedback indicative of the security level;
    determining, by the electronic system and based on the security level, a corresponding amount of functionality of the electronic system to which the user is provided access; and
    providing, by the electronic system, access to the corresponding amount of functionality of the electronic system at the security level.

2. The method of claim 1, wherein the security level comprises a first security level, and wherein the method further comprises:
    after providing the audible or haptic feedback indicative of the first security level, receiving, by the electronic system, additional sensed fingerprint data that is associated with one or more additional fingers of the user;
    comparing, by the electronic system, the additional sensed fingerprint data to the stored fingerprint data;
    responsive to determining that one or more fingerprints of the additional sensed fingerprint data matches one or more additional corresponding fingerprints of the stored fingerprint data for the authorized user, determining, by the electronic system and based on a quantity of additional matching fingerprints, a second security level from the plurality of security levels;
    providing, by the electronic system, audible or haptic feedback indicative of the second security level; and
    providing, by the electronic system, access to functionality at the second security level.

3. The method of claim 2,
    wherein the second security level is higher than the first security level, and
    wherein providing access to functionality at the second security level comprising providing additional functionality at the second security level relative to the first security level.

4. The method of claim 2, wherein receiving the additional sensed fingerprint data that is associated with the one or more additional fingers of the user is performed by the electronic system responsive to determining that a period of time allotted for fingerprint sensing has not expired.

5. The method of claim 1, further comprising:
    determining, by the electronic system, at least one finger type of the one or more matching fingerprints of the sensed fingerprint data,
    wherein determining the security level from the plurality of security levels is further based on the at least one finger type.

6. The method of claim 1, wherein the plurality of fingerprints of the user associated with the sensed fingerprint data are sensed contemporaneously by the electronic system.

7. The method of claim 1, wherein providing access to functionality at the determined security level comprises outputting, by the electronic system and for display, information associated with at least one of a software application or a data file accessible to the user based on the determined security level.

8. The method of claim 1, wherein the context associated with the electronic system comprises one or more of a location of the electronic system, a current time of day, a current date, a speed of travel of the electronic system, a direction of travel of the electronic system, an elevation or altitude of the electronic system, calendar events of the user, or currently active software applications executed by the electronic system.

9. The method of claim 1, further comprising:
    determining, by the electronic system, whether the user is operating the electronic system with one hand or both hands of the user,
    wherein determining the security level is further based on whether the user is operating the electronic system with one hand or both hands of the user.

10. An electronic system, comprising:
    at least one processor;
    at least one sensor; and
    a memory configured to store instructions that are executable by the at least one processor to:
        store fingerprint data to produce stored fingerprint data for an authorized user of the electronic system;
        receive sensed fingerprint data responsive to the at least sensor sensing a plurality of fingers of a user, wherein the sensed fingerprint data is associated with a plurality of fingerprints that correspond to the plurality of fingers of the user;
        compare the sensed fingerprint data to the stored fingerprint data;
        responsive to determining that one or more fingerprints of the sensed fingerprint data matches one or more corresponding fingerprints of the stored fingerprint data for the authorized user, determine, based on a context associated with the electronic system, a security level from a plurality of security levels that each corresponds to a particular amount of functionality of the electronic system to which the user may be provided access within the multi-level secure environment, wherein the context associated with the electronic system comprises at least one internal or environmental condition in which the electronic system operates;

provide audible or haptic feedback indicative of the security level;

determine, based on the security level, a corresponding amount of functionality of the electronic system to which the user is provided access; and provide access to the corresponding amount of functionality of the electronic system at the security level.

11. The electronic system of claim 10, wherein the security level comprises a first security level, and wherein the instructions stored by the memory are further executable by the at least one processor to:

after providing the audible or haptic feedback indicative of the first security level, receive additional sensed fingerprint data that is associated with one or more additional fingers of the user;

compare the additional sensed fingerprint data to the stored fingerprint data;

responsive to determining that one or more fingerprints of the additional sensed fingerprint data matches one or more additional corresponding fingerprints of the stored fingerprint data for the authorized user, determine, based on a quantity of additional matching fingerprints, a second security level from the plurality of security levels;

provide audible or haptic feedback indicative of the second security level; and provide access to functionality at the second security level.

12. The electronic system of claim 11,
wherein the second security level is higher than the first security level, and
wherein the instructions stored by the memory that are executable by the at least one processor to provide access to functionality at the second security level are further executable by the at least one processor to provide additional functionality at the second security level relative to the first security level.

13. The electronic system of claim 11, wherein the instructions stored by the memory are executable by the at least one processor to receive the additional sensed fingerprint data that is associated with the one or more additional fingers of the user responsive to determining that a period of time allotted for fingerprint sensing has not expired.

14. The electronic system of claim 10, wherein the instructions stored by the memory are executable by the at least one processor to determine the security level from the plurality of security levels further based on at least one finger type of the one or more matching fingerprints of the sensed fingerprint data.

15. The electronic system of claim 10, wherein the instructions stored by the memory that are executable by the at least one processor to provide access to functionality at the determined security level are further executable by the at least one processor to output, for display, information associated with at least one of a software application or a data file accessible to the user based on the determined security level.

16. The electronic system of claim 10, wherein the instructions are further executable by the at least one processor to:

determine whether the user is operating the electronic system with one hand or both hands of the user,
wherein the instructions are executable by the at least one processor to determine the security level further based on whether the user is operating the electronic system with one hand or both hands of the user.

17. A method comprising:

storing, by an electronic system that provides a multi-level secure environment, fingerprint data to produce stored fingerprint data for an authorized user of the electronic system;

receiving, by the electronic system, sensed fingerprint data that is associated with a plurality of fingerprints of a user;

comparing, by the electronic system, the sensed fingerprint data to the stored fingerprint data;

responsive to determining that one or more fingerprints of the sensed fingerprint data matches one or more corresponding fingerprints of the stored fingerprint data for the authorized user, determining, by the electronic system and based on one or more finger types of the one or more matching fingerprints of the sensed fingerprint data, and further based on a context associated with the electronic system, a security level from a plurality of security levels that each corresponds to a particular amount of functionality of the electronic system to which the user may be provided access within the multi-level secure environment, wherein each of the plurality of security levels is associated with a respective finger type, and wherein the context associated with the electronic system comprises at least one internal or environmental condition in which the electronic system operates;

providing, by the electronic system, audible or haptic feedback indicative of the security level;

determining, by the electronic system and based on the security level, a corresponding amount of functionality of the electronic system to which the user is provided access; and providing, by the electronic system, access to the corresponding amount of functionality of the electronic system at the security level.

18. The method of claim 17, wherein determining the security level from the plurality of security levels comprises determining a first security level, and wherein the method further comprises:

after providing the audible or haptic feedback indicative of the first security level, receiving, by the electronic system, additional sensed fingerprint data that is associated with one or more additional fingers of the user;

comparing, by the electronic system, the additional sensed fingerprint data to the stored fingerprint data;

responsive to determining that one or more fingerprints of the additional sensed fingerprint data matches one or more additional corresponding fingerprints of the stored fingerprint data for the authorized user, determining, by the electronic system and based one or more additional finger types of the one or more matching fingerprints of the additional sensed fingerprint data, a second security level from the plurality of security levels;

providing, by the electronic system, audible or haptic feedback indicative of the second security level; and providing, by the electronic system, access to functionality at the second security level.

19. The method of claim 18,
wherein the second security level is higher than the first security level, and
wherein providing access to functionality at the second security level comprising providing additional functionality at the second security level relative to the first security level.

20. The method of claim 18, wherein receiving the additional sensed fingerprint data that is associated with the one or more additional fingers of the user is performed by the electronic system responsive to determining that a period of time allotted for fingerprint sensing has not expired.

21. The method of claim 17, further comprising:
determining, by the electronic system, whether the user is operating the electronic system with one hand or both hands of the user,
wherein determining the security level is further based on whether the user is operating the electronic system with one hand or both hands of the user.

* * * * *